US006122944A

United States Patent [19]

Chandra et al.

[11] Patent Number: 6,122,944

[45] **Date of Patent: *Sep. 26, 2000**

[54] KEY OPERATED ROTARY SWITCH FOR DISABLING AN AUTOMOBILE AIR BAG SUPPLEMENTAL RESTRAINT SYSTEM

[75] Inventors: Kannan Chandra, Southfield; Dennis Kaufman, Farmington; James Larsen; Rajkumar Ramamurthy, both of Farmington Hills, all of Mich.

[73] Assignee: Methode Electronics, Inc., Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/046,750

[22] Filed: Mar. 24, 1998

[51] Int. Cl.[7] .................... E05B 17/00

[52] U.S. Cl. .................... 70/388; 200/43.08; 280/278.1; 70/DIG. 30

[58] Field of Search .................... 70/388, 255, DIG. 30, 70/438, 252, 254; 280/278.1; 200/43.08, 43.04

[56] References Cited

U.S. PATENT DOCUMENTS

| | | | |
|---|---|---|---|
| 1,093,662 | 4/1914 | Tyden | 70/432 |
| 1,284,491 | 11/1918 | Thiede | 70/DIG. 30 |
| 1,675,737 | 7/1928 | Teich | 70/432 |
| 1,747,383 | 2/1930 | Norviel | 70/DIG. 30 |
| 1,898,127 | 2/1933 | Hershey | 70/432 |
| 2,060,951 | 11/1936 | Rae et al. | 70/DIG. 30 |
| 2,568,206 | 9/1951 | Seaman et al. | 70/388 |
| 3,320,782 | 5/1967 | Turman | 70/388 |
| 3,391,260 | 7/1968 | Messera | 70/388 |
| 3,912,886 | 10/1975 | Allen et al. . | |
| 4,022,039 | 5/1977 | Mikos | 70/388 |
| 4,253,319 | 3/1981 | Feichtiger | 70/264 |
| 4,730,090 | 3/1988 | Raab et al. . | |
| 5,539,165 | 7/1996 | Wu | 70/DIG. 30 |
| 5,544,914 | 8/1996 | Borninski et al. | 180/282 |
| 5,629,505 | 5/1997 | Cryer | 200/61.54 |
| 5,866,954 | 2/1999 | Daniel et al. | 180/282 |

*Primary Examiner*—Darnell Boucher
*Attorney, Agent, or Firm*—Karl D. Kovach; David L. Newman

[57] ABSTRACT

A key operated switch is provided for disabling an automobile air bag passive restraint system. The two or four position switch includes a housing, a rotor, a plurality of rotationally actuated electrical switch elements, a key ejecting mechanism, and a positive positioning detent. The switch assembly is arranged such that a transverse surface of the rotor defining a key slot is accessible through the housing. The key slot allows an operating key to be manually inserted into the rotor. In or order to insert the key, however, the therein, a certain minimum amount of force must be applied to the key sufficient to overcome the key ejecting mechanism. In the absence of such minimum insertion force, the key ejecting mechanism will act expel the key from the rotor. Once inserted into the rotor, the key may be manually rotated which causes corresponding rotation of the rotor. The rotation of the rotor in turn, actuates select electrical switch elements attached to the rotor, according to the angular position of the rotor. The electrical switch elements define a plurality of distinct switch states, each corresponding to a particular angular position of the rotor. Finally, the positive positioning detent forces the rotor to an angular position corresponding one of the distinct switch states defined by the electrical switch elements during those periods when no external torque is being applied to the rotor.

3 Claims, 5 Drawing Sheets

KEY OPERATED ROTARY SWITCH FOR DISABLING AN AUTOMOBILE AIR BAG SUPPLEMENTAL RESTRAINT SYSTEM

BACKGROUND OF THE INVENTION

1. Field of the Invention

The present invention relates to a key operated rotary switch particularly adapted for enabling and disabling an automobile air bag supplemental restraint system.

2. Discussion of the Background

Airbag supplemental restraint systems have been widely used to protect automobile occupants in the event of a front impact collision. Typically an airbag unit will be located in an automobile's steering wheel and another will be located in the dashboard opposite the front passenger seat. During a crash, impact sensors located in the car's bumper will sense the onset of the collision and send an electrical signal to the airbags. The electrical signals ignite small explosive charges within each airbag unit, and the ensuing controlled explosions generate large amounts of expanding gases which rapidly inflate the airbags, thereby forming a gaseous cushion to protect the driver and/or a passenger riding in the front of the car.

While airbags have been very successful in preventing injuries and death, it has also been found that under certain conditions the airbags themselves may pose a potential safety hazard due to the explosive force with which they are deployed. Generally these situations are limited to those where the driver and/or the front seat passenger are relatively small in physical stature, or when small children are placed in the front seat of the vehicle. In these cases, the explosive force of the airbag deployment is sufficient to cause severe impact injuries to the passenger which the airbag unit is putatively designed to protect. Thus, in these situations it may be desirable to selectively disable one or more of the front airbags.

In the majority of cases, the safest mode of operating the vehicle will be to have all of the automobile's airbag systems enabled. However, in those rare occasions when the operator of the vehicle has determined that it is safer to disarm one or more of the airbag units, an interface must be provided whereby the operator may interact with the airbag system to selectively enable or disable the various airbag units. A manually operated switch may provide such an interface, however, the addition of such a switch raises a number of safety concerns which must be considered before such a switch may be safely integrated into the airbag system.

A first issue raised by adding a disabling switch to the airbag system is how to limit access to the switch itself. The switch must be protected such that only a limited number of responsible individuals may change the configuration of the airbag system. This is desirable so that only those individuals responsible for the vehicle, such as the owner, or the primary driver of the vehicle, may configure the airbags in a manner which they deem appropriate and feel confident that the airbags will or will not deploy as selected in the event of a collision. A simple method of controlling access to the disarm switch is to make the switch key operated, then limiting access to the key. However, adding a key switch to the passenger compartment of an automobile raises further safety issues which must also be addressed in designing a safe and effective airbag disarm switch.

A significant drawback to locating key operated switches within the passenger compartment of an automobile is that the key, when left within the switch mechanism, represents a potential source of injury to occupants of the car in the event of a collision. The sharp narrow contours of a key extending from the switch housing can cause severe puncture wounds to a human body impacting the key due to the force of the collision. In fact, the auto industry has strict homologation standards for the design of objects which protrude into the passenger compartment of a vehicle. Such objects must maintain certain minimal radial dimensions to meet the standard. Generally, a key protruding from a dash mounted airbag disarm switch is unlikely to meet this standard. Therefore, if a key switch is to be employed for enabling and disabling one or more airbags, it is desirable that the key switch include a mechanism for ejecting the key when the settings of the switch are not being manipulated.

A second problem with employing a key switch to arm and disarm an airbag, is that most standard rotary type switches can be manipulated into an ambiguous middle position between valid switch states. If this were to occur in an airbag disable switch, the operator of the vehicle could not be certain how the airbag system would deploy in the event of a collision. It is possible that airbags could deploy when they were not supposed to, or fail to deploy when it was desired that they should. In either case, the result could mean catastrophic injury to the occupants of the vehicle.

In light of these problems with the prior art, what is desired is a key operated switch which will act to expel the operating key whenever the operator physically releases the key. Another feature which should be included is a positioning mechanism which will ensure that the electrical switch contacts on the switch are forced into an unambiguous switch state at all times. Such a switch would require a certain amount of external force to insert a key, for example the ignition key for starting the automobile's engine, into the airbag disarm switch and hold it there. When such force is removed, the switch should expel the key regardless of the position of the rotary mechanism within the switch. Thus, the key may tot be inadvertently left in the switch mechanism where it may pose a risk of injury to the occupants of the vehicle. With the key inserted into the switch, the key can be used to rotate the internal switch mechanism. As the rotary mechanism is rotated, the positive positioning mechanism must ensure that the switch contacts remain in a valid switch state at all times, with the transition from one state to another happening in a positive, near instantaneous manner, such that there can be no ambiguity as to which state the switch is in. The positive positioning mechanism should then ensure that the switch remains in that state until sufficient torque is applied through the key to rotate the switch into the next adjacent state. It is also desired that such a switch may be employed as a two position switch for enabling and disabling a single airbag unit, or as a four position switch for selectively enabling and disabling two airbag units.

SUMMARY OF THE INVENTION

In light of the prior art as described above, one of the main objectives of the present invention is to provide a key operated rotary switch which may be safely installed in the passenger compartment of an automobile, and employed to selectively enable and disable an airbag supplemental restraint system.

A further object of the present invention is to provide a two position rotary switch for enabling and disabling a single automobile airbag supplemental restraint.

Another objective of the present invention is to provide a four position rotary switch for selectively enabling and disabling a driver side and a passenger side airbag whereby multiple operating configurations may be implemented.

Still another objective of the present invention is to provide a switch having a plurality of distinct switched states, wherein the switch positioned in any one of the distinct switched states generates a particular output voltage which can be used to remotely sense the position of the switch.

Yet another objective of the present invention is to provide a key operated switch which prevents an operator from inadvertently leaving the operating key within the switch mechanism.

An additional objective of the present invention is to provide a key operated rotary switch which ejects the key from the switch mechanism immediately upon the operator releasing the key.

A further objective of the present invention is to provide a rotary switch having a positive positioning mechanism which ensures that the switch contacts are at all times positioned in an unambiguous, clearly defined switch state which may be readily discerned by the switch operator.

A still further objective of the present invention is to provide a key operated rotary switch having a positive positioning mechanism which acts to maintain the switch contacts in any given valid switch state until sufficient torque is applied to the key to move the switch contacts to the next valid switch state.

Another additional objective of the present invention is to provide a rotary switch wherein the positive positioning mechanism is configured such that the transition of the switch contacts from one valid switch state to another occurs in a quick and definite manner such that the switch contacts will not be delayed in an ambiguous intermediate position between valid switch states.

All of these objectives, as well as others that will become apparent upon reading the detailed description of the presently preferred embodiment of the invention below, are met by the key operated rotary switch herein disclosed.

The present invention relates to a key operated rotary switch which is particularly well adapted to function as an airbag enable/disable switch which may be installed within the passenger compartment of an automobile. An embodiment of the invention includes a two piece housing having a cover and an intermateable base. The housing encloses a rotor assembly which rotatably actuates the electrical switch components. The rotor is a generally cylindrical member having a transverse upper surface which is exposed through the cover of the housing. A slotted aperture formed in the transverse surface of the rotor, centered on the rotational axis thereof is configured to receive the key which operates the switch. Electrical switch elements are also contained within the housing. The electrical switch elements are configured such that rotation of the rotor opens and closes various circuit paths within the switch such that the position of the rotor can be determined based upon which circuit path is closed at any given time.

In a preferred embodiment the electrical switch elements include a printed circuit board having a plurality of conductive pads formed thereon mounted within the housing and a rotating wiper contact driven by the rotor. As the angular position of the rotor changes the wiper contact forms an electrical connection between various contact pads on the circuit board thereby providing the switching action of the apparatus. It is further preferred that the contact pads formed on the printed circuit board include a single common output pad and a plurality of input contact pads connected to various resistors. The wiper contact connects the common signal pad to the different input contact pads, moving from one input contact pad to the next as the rotor turns. Thus, the output circuit is connected to various input resistors depending on the position of the rotor, thereby producing a multiplexed output signal wherein specific output voltages represent specific switch positions.

Another aspect of the invention relates to a key ejecting mechanism which acts to expel the operating key from the rotor if the operator fails to hold the key in place. In the preferred embodiment the ejecting mechanism comprises a spring loaded plunger internally disposed within the rotor. The plunger includes a flat surface which abuts the upper surface of the rotor, blocking the slotted aperture formed therein. In this configuration the plunger must be linearly displaced to allow the operating key to be inserted into the rotor. Therefore the key must be inserted with sufficient force to overcome the spring force biasing the plunger. In the absence of such force, the spring force biasing the plunger forces the key out of the rotor.

Another novel aspect of the invention relates to a positive positioning detent mechanism which insures that the switch is maintained in a valid switch state such that the devices controlled by the switch will at all times function in an expected manner. In the preferred embodiment, the positioning detent acts against the rotor in a manner such that, when the rotor has an angular position corresponding to the switch contacts being between valid switch states, the positioning detent forces the rotor to an angular position corresponding to the switch contacts being placed in a valid switch state. The preferred positioning detent includes a cog like cam surface having sharp triangular teeth disposed around at least a portion of the outer circumference of the rotor.

A spring loaded cam follower mates with the inverted triangular spaces between the triangular teeth thereby releaseably locking the rotor in a given angular position. As sufficient torque is applied to the key, the spring force behind the cam follower is overcome and the rotor is free to rotate until the sharp point of one of the adjacent triangular teeth passes under the cam follower and the cam follower springs forward into the space between the next two adjacent triangular teeth. The spring loaded cam follower tends to force the rotor to angular positions wherein the tip of the cam follower rests at the bottom of the spaces between the triangular teeth of the cam surface formed on the outer circumference of the rotor. These particular angular positions correspond to the valid switch states for the electrical switch elements rotatably connected to the rotor. In addition to ensuring that the electrical switch contacts remain in valid switch states, the cam surface of the rotor and the cam follower further provide a solid tactile feel to the switch mechanism.

Thus is provided a key operated switch for disabling an automobile air bag supplemental restraint system. The switch includes a housing for containing a rotor, a plurality of electrical switch elements, a key ejecting mechanism and a positive positioning detent. A transverse upper surface of the rotor defines a key slot allowing the operating key to be manually inserted into the rotor when sufficient insertion force is applied to overcome the key ejecting mechanism. In the absence of such minimal insertion force, the key ejecting mechanism acts to expel the key from the rotor. When the key is inserted into the rotor and manually rotated, the rotor is rotated in a corresponding manner. The rotation of the rotor actuates various electrical switch elements based on the angular position of the rotor. Furthermore, the electrical switch elements define a plurality of distinct switch states, each corresponding to a different angular position of the rotor.

When torque is not being applied to the rotor, the positive positioning detent forces the rotor to an angular position corresponding to one of the distinct switch states.

DETAILED DESCRIPTION OF THE PRESENTLY PREFERRED EMBODIMENTS

Figure 1:
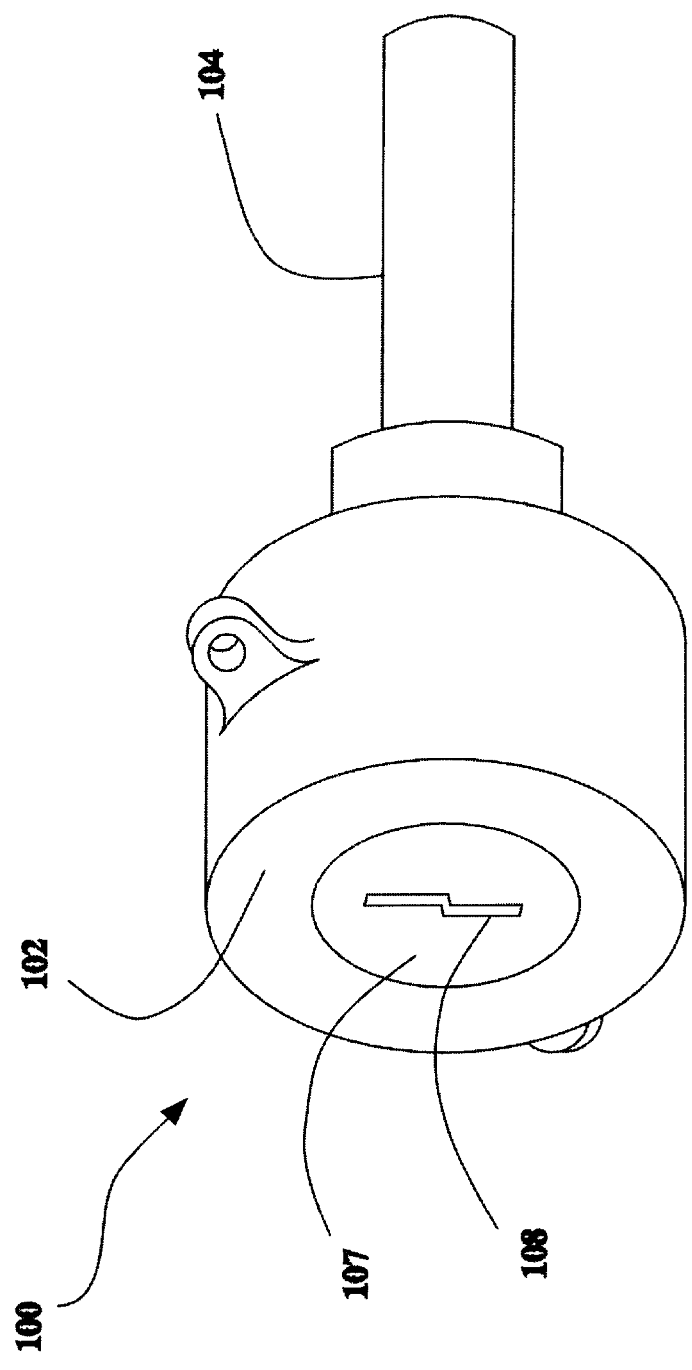
FIG. 1 is an isometric view of a key operated rotary switch according to the present invention.
Figure 2:
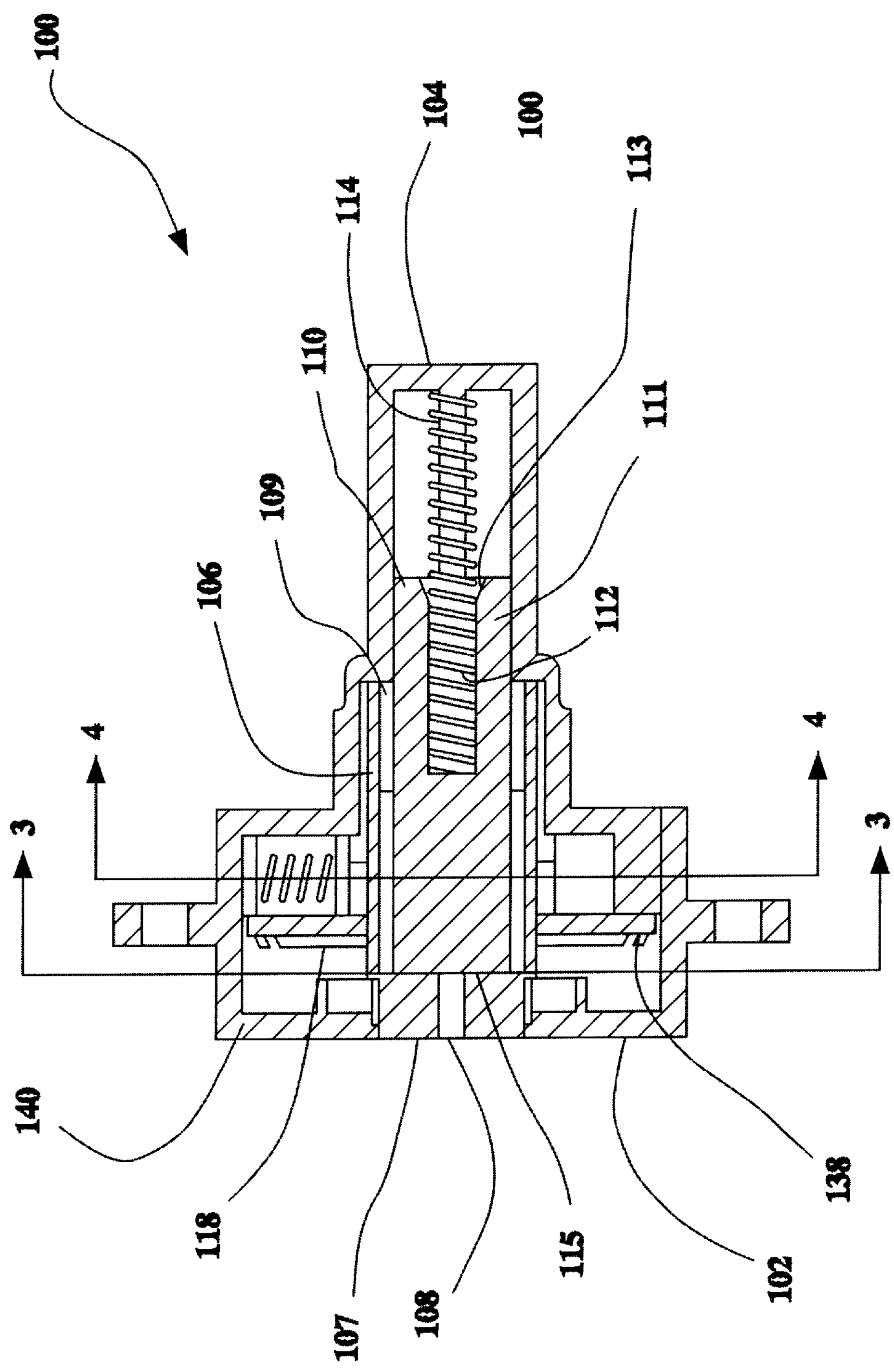
FIG. 2 is a section view of the key operated rotary switch of FIG. 1 taken along the centerline of the device.

Referring to FIGS. 1 and 2 a key operated rotary switch is shown 100. The key operated switch includes a two piece housing including a cover 102 and a base 104. Contained within the housing is a cylindrical rotor 106. A transverse front end-of the rotor 107 includes a key receiving slot 108 centered about the rotational axis of the rotor. The rotor 106 is essentially a hollow cylinder having an open base 109. A separate cylindrical plunger 110 is mounted within the rotor 106. As with the rotor, the plunger 110 is also configured as a hollow cylinder. A rear end 111 of plunger 110 forms a hollow central bore 113 for accommodating a coiled compression spring 112. The coil spring 112 is disposed within the hollow central bore 113, between the plunger 110 and the base of the housing 104. A guide post 114 extends internally from the base 104 to support the lower portion of the spring 12. The coil spring loads the plunger such that a flat upper surface of the plunger 115 is biased against the transverse front end of the rotor 107. Furthermore, the flat upper surface of the plunger 115 entirely blocks the key receiving slot 108 formed in the front end of the rotor.

When the operating key (not shown) is inserted into the key slot 108, the plunger 110 is linearly displaced along the axis of the spring, thereby compressing the spring between the plunger 110 and the base 104. In this state, the compressed spring 112 generates a spring force acting against the plunger in the direction opposite the direction of displacement of the plunger 110. If the key is released while the spring 112 is compressed in this manner, the spring force acting against the plunger will be sufficient to expel the key from the rotor. The plunger 110 and spring 112 thereby form a key ejecting mechanism which prevents the key from being inadvertently left within the switch mechanism where it would otherwise pose a serious risk of injury to the occupants of the vehicle if there is a collision.

Figure 3:
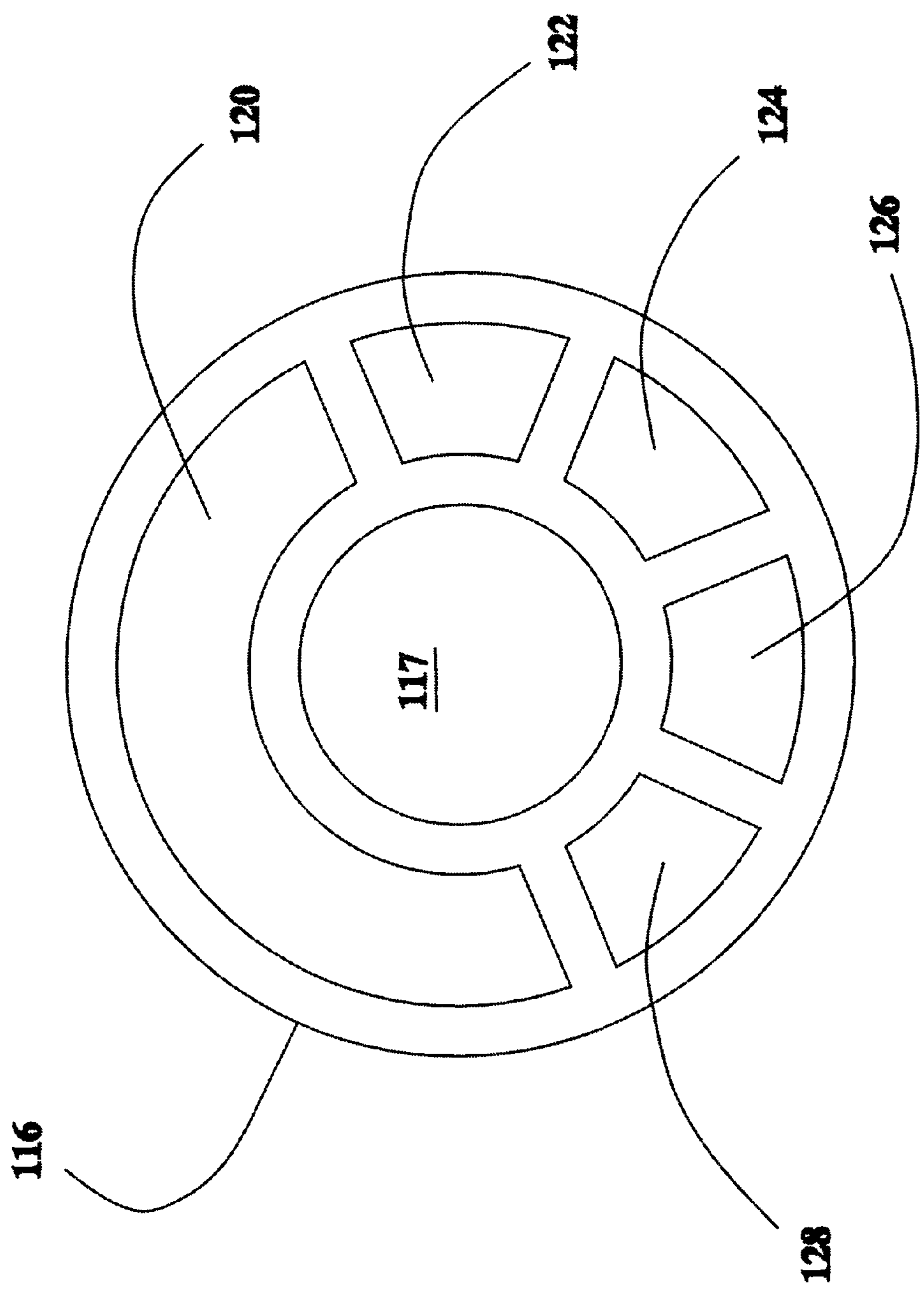
FIG. 3 is a plan view of the printed circuit board mounted within the switch housing.
Figure 4:
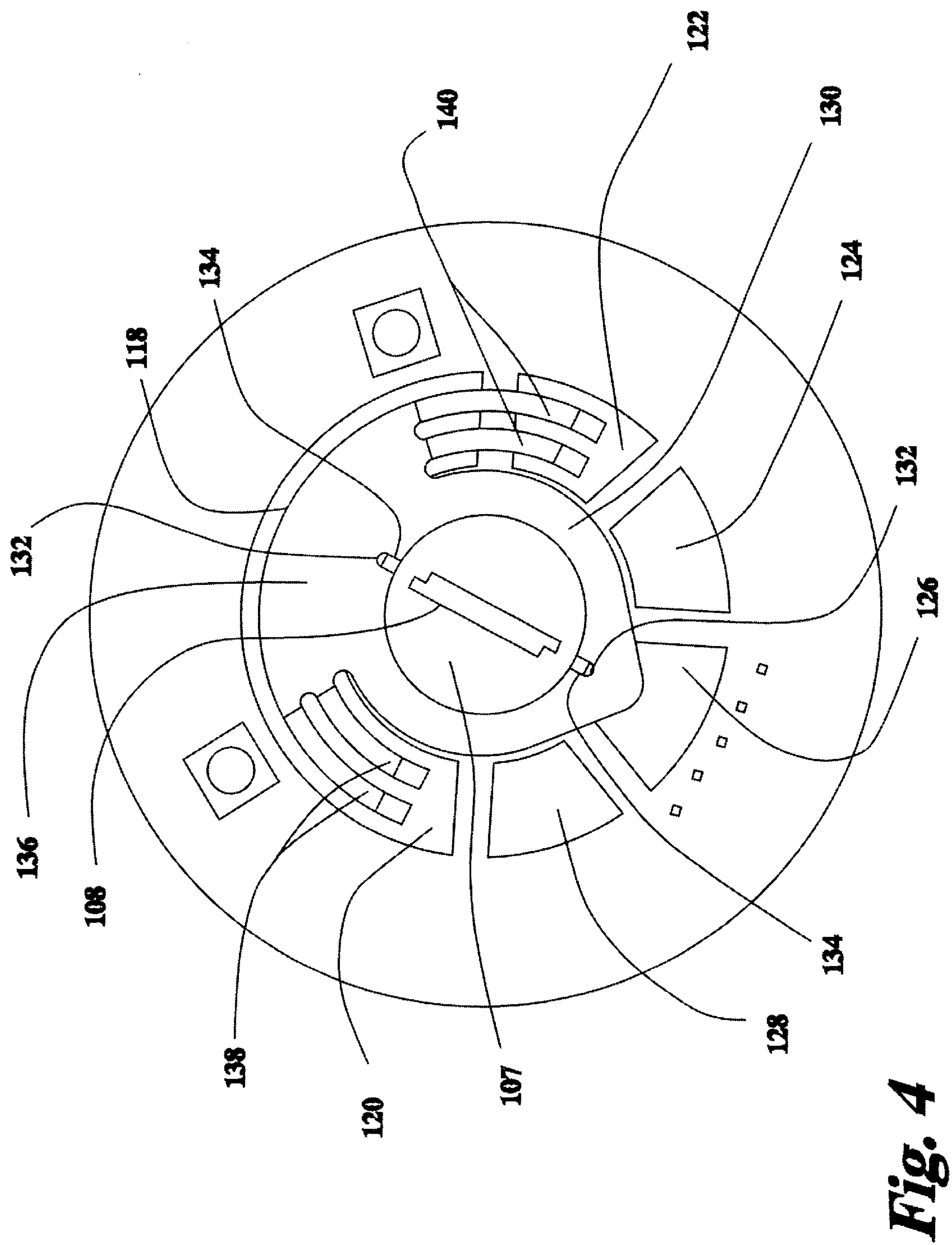
FIG. 4 is a section view of the key operated rotary switch of FIG. 1 taken along section line 3—3 in FIG. 2.

Referring now to FIGS. 2, 3, and 4, the preferred embodiment of the electrical switch contacts will now be described. The switch elements generally comprise the printed circuit board 116 and the wiper-contact 118. The circular printed circuit board includes a large central aperture 117 allowing the front end 107 of the rotor 106 to protrude through the center of the printed circuit board. The circuit board 116 is fixedly mounted within the switch housing such that the printed circuit board remains stationary with respect to the rotor. Various circuit components such as resistors (not shown) may be mounted on the printed circuit board. In addition to such components, a series of conductive contact pads are also formed on the surface of printed circuit board 116. A first contact pad 120 is much larger than the remaining contact pads, and extends in a large arc across a significant portion of the printed circuit board. This larger contact pad 120 represents the switch common and is connected to the output lead of switch assembly 100. The remaining contact pads 122, 124, 126, and 128 represent the first, second, third, and fourth switch position contact pads respectively. It should be noted here that the printed circuit board 116 shown in FIG. 3 corresponds to a four position switch assembly. The number of switch positions may be readily altered by merely adding or deleting contact pads from the surface of the printed circuit board, and/or by limiting the rotation of rotor 106.

In FIG. 4 the wiper contact 118 is shown mounted above the printed circuit board 116 where the wiper is configured to rotatably engage the various contact pads formed on the surface of the printed circuit board. The wiper contact 118 is formed of a single conductive metal stamping having a somewhat irregular shape. A narrow band portion 130 forms a ring which is configured to encircle the front end 107 of the rotor 106. The band portion includes radial notches 132 formed on the inner diameter thereof. The radial notches correspond to radial posts 134 formed on the outer circumference the rotor. When the switch is assembled, the posts 134 fit snuggly within the notches 132 such that rotational motion of the rotor is translated to the wiper contact 118 and the two members rotate in unison. The wiper contact includes a wider portion 136 extending from the narrow band 130 and including a first pair of cantilevered contact fingers 138 and a second pair of cantilevered contact fingers 140. As can best be seen in the section view of FIG. 2, both pairs of cantilevered contact fingers are bent downward such that they engage the surface of printed circuit board 116. The shape of the cantilevered fingers is such that when the entire switch is assembled the fingers are compressed against the printed circuit board, forming a leaf spring type arrangement, thus ensuring a solid physical connection between the contact fingers and the printed circuit board.

Since the wiper contact is formed of a single metal stamping, it should be clear that the wiper contact will form a direct low resistance circuit path between an object contacted by the first pair of cantilevered contact fingers 138 and an object contacted by the second pair of cantilevered contact fingers 140. Therefore, when the operating key is inserted into the rotor and manually rotated, the turning rotor causes the wiper contact 108 to rotate above the printed circuit board 116, and the cantilevered contact fingers are dragged across the various conductive contact pads formed on the surface of the printed circuit board. The angular spacing between the first pair of contact fingers 138 and the second pair of contact fingers 140 coupled with the geometry of the contact pads allows the wiper contact to sequentially connect the first, second, third, then finally, the fourth position contact pads, 122, 124, 126, 128 to the common contact pad 120 as the rotor 106 is rotated in the clockwise direction.

As discussed in the background of the invention, it is anticipated that the present switch assembly will be employed in an automobile as an airbag enable/disable switch. Both a two position and a four position switch are envisioned, the two position switch being adapted to enable and disable a single airbag unit, and the four position switch being adapted to selectively enable and disable in various combinations, both the driver side and passenger side airbags. In the preferred embodiment of a two position switch, a first switch position will correspond to Airbag Enable, and a second switch position will correspond to Airbag Disable. In a four position version of the switch, a first switch position will correspond to Driver Side Airbag and Passenger Side Airbag Enable, a second position will correspond to "Driver Side Airbag Enable, Passenger Side Airbag Disable, a third position will correspond to Driver Side Airbag Disable, Passenger Side Airbag Enable, and a fourth position corresponds to Driver side Airbag and Passenger Side Airbag Disable.

The various switch states outlined above are physically defined by the cantilevered contact fingers 138, 140, of the wiper contact 108, and in the case of a two position switch, which of the first or second position contact pads 122, 124 are engaged thereby. In the case of a four position switch, the switch states are defined by which one of the first, second, third, or fourth position contact pads 122, 124, 126, 128 is connected to the common contact pad 120 through the cantilevered contact fingers 138, 140 of the wiper contact 108. In the preferred embodiment of the invention, when the rotor has been rotated 0° the wiper contact will connect the first position contact pad 122 to the common contact pad 120. When the rotor has been rotated 45°, the wiper contact will connect the second position contact pad 124 to the common contact pad 120. If the switch is to be a two position switch, rotation of the rotor 106 will be limited to these two positions. However, with a four position switch, the rotor may be rotated 90° where the wiper contact will connect the third position contact pad 126 to the common contact pad 120. Finally, in a four position switch with the rotor rotated 135°, the wiper contact will connect the fourth position contact pad 128 to the common contact pad 120. Thus, the various switch states of the preferred embodiment correspond to rotor being rotated 0°, 45°, 90°, and 135°.

In the preferred embodiment, the output of the switch assembly 100 is a single voltage multiplexed signal. A multiplexed output signal allows the switch assembly to be constructed with only two signal leads entering the assembly. The multiplexed output signal represents each distinct switch state as a separate voltage level as measured between the two signal leads. These differing voltage levels are established by connecting resistors of differing values to each of the first, second, third, and fourth position contact pads 120, 122, 124, and 126. A first signal lead supplies a single voltage, such as +5V DC, to each of the resistors. The second signal lead is connected directly to the common contact pad 120. A monitoring circuit located elsewhere on the vehicle supplies a constant current to the switch, and measures the voltage drop across the two signal leads. Since the current supplied to the switch is constant, the voltage drop across the switch will change depending on which resistor is placed in series across the two signal leads. This is determined by which of the first, second, third, or fourth contact pads, 122, 124, 126, 128 is connected to the common contact pad 120 via the wiper contact 108. This in turn is determined by the angular position of the rotor. In other words, the angular position of the rotor determines which resistor is connected across the switch leads, and therefore determines the output voltage of the switch. Clearly, working backward, by measuring the voltage output of the switch the angular position of the rotor may be determined.

Figure 5:
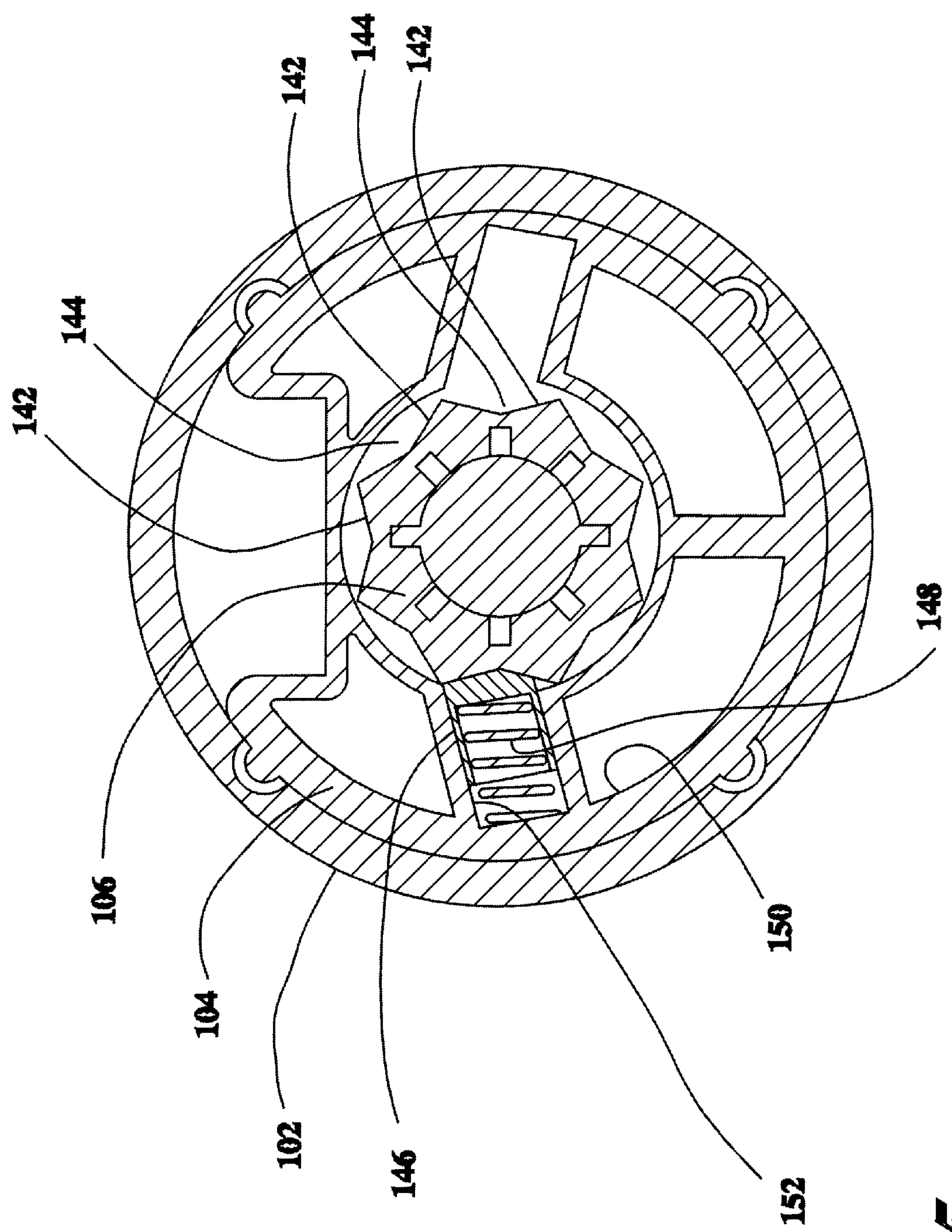
FIG. 5 is a section view of the key operated rotary switch of FIG. 1 taken along section line 4—4 in FIG. 2.

Turning to FIG. 5, the key operated rotary switch of the present invention further includes a positive positioning detent mechanism to ensure that the switch contacts remain at all times in an unambiguous and valid switch state. The positive positioning detent mechanism serves to create a sharp and definite transition from one switch state to another and prevents the switch contacts from being manipulated into a position where the second pair of cantilevered contact fingers 140 are caught between any two of the first, second, third and fourth position contact pads, or possibly contacting two of such pads at the same time.

The positive positioning mechanism operates based on the interaction between the rotor 106, and a spring loaded cam follower 146. In the preferred embodiment, an outer circumference of the rotor is formed as a cog or gear having a plurality of sharp triangular teeth 142. The teeth in turn, are each separated by corresponding inverted triangular spaces 144. The triangular teeth are arranged around the circumference of the rotor such that the angular distance between adjacent spaces 144 is identical to the angular distance between each of the first, second, third, and fourth position contact pads 122, 124, 126, 128 formed around the circumference of the printed circuit board 116.

The cam follower 146 is biased against the surface of the rotor by a coil spring 148 which is compressed between the cam follower and the circumferential wall 150 of the base of the housing. Both the compressed spring 148 and the cam follower 146 are contained within a guide channel 152 formed in the housing base 104. The guide channel 152 restricts the motion of the cam follower 146 to a reciprocating motion along the axis of the channel. When fully extended, the triangular end of the cam follower mates with one of the inverted triangular spaces 144 formed between two adjacent teeth 142 on the circumference of the rotor. The spring force of the compressed spring 148 drives the cam follower 146 into the triangular recess 144 between the teeth 142 such that the rotor 106 will tend to resist being rotated out of that position.

As already noted, the angular distance between adjacent triangular teeth on the rotor, and therefore also the angular distance between the spaces between the teeth, is the same as the angular distance between the first, second, third, and fourth position contact pads 122, 124, 126, 128 on the printed circuit board 116. The rotor 106, the wiper contact 108 and printed circuit board 118 are all configured such that when the rotor is positioned in a manner allowing the cam follower to extend completely into one of the spaces 144 between adjacent teeth 142, the second pair of cantilevered contact fingers 140 will be positioned directly in the center of one or another of the first, second, third, or fourth position contact pads 122, 124, 126, 128. In other words, the rotor positions wherein the cam follower 146 aligns with the spaces between the gear teeth formed on the rotor correspond to the rotor positions which define the various electrical switch states of the entire apparatus.

Since the rotor 106 will tend to resist being rotated out of the positions where the cam follower 146 is well seated within the spaces 144 between the triangular teeth 142 of the rotor, and since these rotor positions correspond to the valid switch positions wherein the second pair of cantilevered switch contacts 140 unambiguously contact one or another of the first, second, third, or fourth position contact pads 122, 124, 126, 128, the cam follower 146 acts to hold the switch assembly in these valid switch states. Further points concerning the cam follower and the cogged circumferential surface of the rotor 106 should also be noted. As can be seen in the section view of FIG. 5, the cam follower's axis of motion is not directed directly toward the rotational axis of the rotor 106, but is visibly offset by several degrees. Because of this offset, the spring force biasing the cam follower 146 against the rotor 106 creates a moment about the rotational axis of the rotor. If the rotor 106 is in between valid states, such as for example, if the sharp point of one of the triangular teeth 142 formed on the rotor 106 is opposite the cam follower 146, the moment generated by the compressed spring 148 will cause the rotor 106 to rotate until the point where the cam follower is seated within the inverted triangular space 144 between the two next adjacent teeth 142. Thus, the switch mechanism is positively positioned in a valid switch state at all times, and it is not possible to leave the switch contacts in an ambiguous state wherein more than one, or none of the first second, third or fourth position contact pads 122, 124, 126, 128 are connected to the output of the switch. Furthermore, the positive positioning mechanism provides a solid tactile indication when switch states are changed.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A key operated rotary switch comprising:

a housing;

a rotor disposed within the housing, the rotor defining an aperture configured to receive said operating key such that torque may be manually applied to said key, to impart rotational motion to the rotor, and wherein the rotor is rotatable in a first direction and a second direction, and wherein the second direction is opposite the first direction;

at least one electrical switch operably associated with the rotor, the switch having at least two distinct states defined by the angular position of the rotor; and a positive positioning detent mechanism acting against the rotor such that in the absence of torque applied to the rotor through said key, the detent mechanism forces the rotor into an angular position corresponding to one of said distinct switch states, and wherein the positive positioning detent mechanism includes a cam surface disposed on a circumferential surface of the rotor, and wherein the cam surface has a profile including a plurality of similar shaped well defined teeth, each tooth being separated by a well defined space, and wherein the positive positioning detent mechanism includes a cam follower biased against the cam surface, and wherein the cam follower has a cam engaging surface the inverse shape of the spaces formed between the teeth, and wherein angular positions of the rotor corresponding those positions when the cam follower is aligned with the various spaces correspond to the distinct switch states, and wherein the cam follower has an axis of linear motion directed off center to a rotational axis of the rotor, and wherein each of the plurality of similar shaped well defined teeth has the shape of a sharp triangle, and wherein the plurality of similar shaped well defined teeth are located in a plane and wherein the plane is substantially perpendicular to the rotational axis of the rotor.

2. The rotary switch of claim 1 further comprising a key ejecting mechanism associated with the rotor configured to eject said key from the rotor in the absence of an externally applied key insertion force.

3. The rotary switch of claim 2 wherein the cam follower includes a coil spring providing a bias force against the cam surface, the bias force being directed off center from a rotational axis of the rotor.

* * * * *